No. 719,603. PATENTED FEB. 3, 1903.
H. M. McNAMEE.
FOLDING FISHING ROD.
APPLICATION FILED JUNE 18, 1902.
NO MODEL.
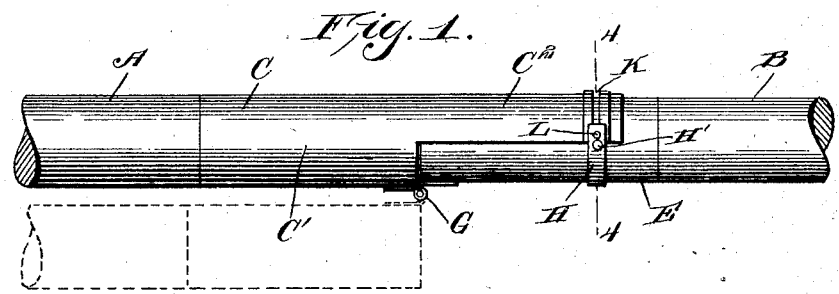
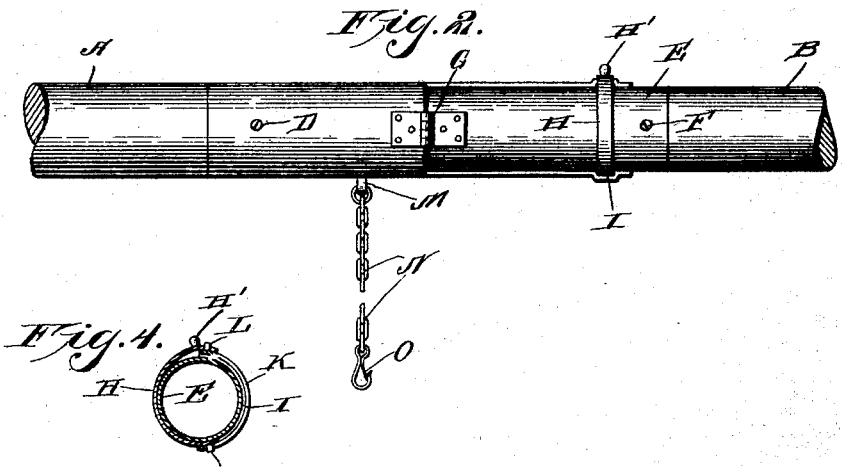
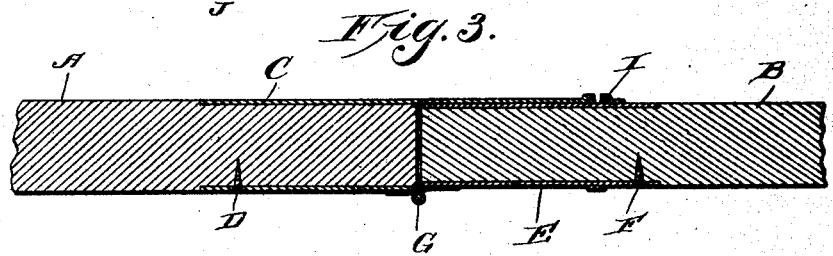
Witnesses
Louis D. Heinrichs
L. H. Morrison
Inventor
Hiram M. McNamee
By his Attorney

UNITED STATES PATENT OFFICE.

HIRAM M. McNAMEE, OF GUYSVILLE, OHIO.

FOLDING FISHING-ROD.

SPECIFICATION forming part of Letters Patent No. 719,603, dated February 3, 1903.

Application filed June 18, 1902. Serial No. 112,133. (No model.)

*To all whom it may concern:*

Be it known that I, HIRAM M. MCNAMEE, a citizen of the United States, residing at Guysville, county of Athens, and State of Ohio, have invented a certain new and useful Improvement in Folding Fishing-Rods, of which the following is a specification.

My invention relates to a new and useful improvement in folding fishing-rods, and has for its object to provide a fishing-rod which instead of being unjoined can be folded up, so that all of the parts are held together, but still can be folded in as compact a parcel as the joined fishing-rod.

With these ends in view this invention consists in the details of construction and combination of elements hereinafter set forth and then specifically designated by the claims.

In order that those skilled in the art to which this invention appertains may understand how to make and use the same, the construction and operation will now be described in detail, referring to the accompanying drawings, forming a part of this specification, in which—

Figure 1 is a side elevation of a portion of a fishing-rod, showing my improved hinged joint; Fig. 2, a plan view of Fig. 1; Fig. 3, a longitudinal section through two sections of the pole and the hinged joint connecting them; Fig. 4, a cross-section taken on the line 4 4, Fig. 1.

A represents one section of the fishing-pole, and B another section.

C is a ferrule, one half of which is formed cylindrical, as indicated at $C'$, and the other half, $C^2$, is formed semicylindrical, and into this cylindrical portion $C'$ of this ferrule fits the end of the section A of the fishing-pole, which is held within the ferrule by any suitable means, here illustrated at a screw D.

E is a cylindrical ferrule secured upon the end of the other section B of the fishing-pole by any suitable means, here illustrated as by a screw F. The outside diameter of the ferrule E is about the same as the inside diameter of the ferrule C, and when the pole is extended the ferrule E is adapted to fit within the semicylindrical portion $C^2$ of the ferrule C, as illustrated in Fig. 1. The cylindrical portions of the ferrule C and the ferrule E are hinged together, as at the point G.

Thus by swinging the section B of the rod upon the handle G it may be swung in or out of the semicylindrical portion $C^2$ of the ferrule C. For the purpose of holding the sections of the rod in a straight line when extended I provide a curved strap H, which slides within a groove or guideway I, provided in the end of the semicylindrical portion $C^2$ of the ferrule C, and this strap carries a pin J, which extends through a slot K, formed through the semicylindrical portion $C^2$ in the center of the groove or guideway I. This pin and slot are simply for the purpose of preventing the strap H from being pulled entirely clear of the portion $C^2$. This curved strap is provided with a knob $H'$ for the manipulation of the strap, and the other end of the strap opposite the pin J is provided with an opening, and extending outward from the semicylindrical portion $C^2$ is a pin L. When the ferrule E lies within the semicylindrical portion $C^2$ of the ferrule C, the strap H may be pulled around the ferrule E, and by snapping the perforated end of the strap over the pin L the two parts are held tightly in alinement; but when it is desired to fold the pole the strap H is disengaged from the pin L and pushed back in its guideway I, so as to lie wholly within the curvature of the semicylindrical portion $C^2$. Then the pole may be folded, as indicated in dotted lines in Fig. 1.

Of course it will be understood that there may be as many joints in the pole as desired; but if there are more than two sections the other sections will be made to fold on the quarter, so that when folded it will make a square or round package instead of making a flat package, as would occur if all of the sections were hinged upon the same side; but this is a detail which is immaterial to the invention.

Secured to the ferrule C is a staple M, which may be secured to said ferrule in any suitable manner, such as being pressed through an opening formed through the ferrule before the section A is inserted. To this staple M is secured a chain N, which chain has upon its end a snap-hook O, and when all the sections of the pole are folded this chain may be wrapped around the sections and the snap-hook snapped in one of the links of the chain, thereby holding the sections together.

The advantage of my invention is that while I am enabled to provide a folding fishing-rod none of the sections of the rod are ever disengaged from one another, so that they cannot become lost, and the sections cannot be pulled away from one another while fishing and be carried off by the fish, as sometimes occurs.

Of course I do not wish to be limited to the exact construction here shown, as slight modifications could be made without departing from the spirit of my invention.

Having thus fully described my invention, what I claim as new and useful is—

1. In a joint for folding fishing-rods, a ferrule fitted upon one section of the rod, said ferrule being cylindrical where it surrounds the rod, a semicylindrical portion formed with the ferrule and extending outward beyond the rod, a cylindrical ferrule fitted and secured upon the other section of the rod, the last-named ferrule being of such diameter as to fit snugly within the semicylindrical portion of the first-named ferrule, the cylindrical portion of the first-named ferrule being hinged to the other ferrule, and means for holding the male ferrule within the female ferrule, as and for the purpose specified.

2. In a joint for fishing-rods, a ferrule C fitted and secured upon the end of one section of the rod, said ferrule consisting of the cylindrical portion $C'$ surrounding the rod, a semicylindrical portion $C^2$ formed with the ferrule and extending out from the end of the rod, a cylindrical ferrule E fitted and secured upon the end of the other section of the rod and adapted to fit snugly within the semicylindrical portion of the other ferrule, the cylindrical portion of the ferrule C hinged to the ferrule E, a curved strap fitted in suitable guideways in the outer end of the semicylindrical portion of the ferrule C, said strap adapted to be pulled around the ferrule E, and means for securing it around said ferrule to the semicylindrical portion $C^2$, as and for the purpose specified.

3. In a folding-fishing-rod joint, a cylindrical ferrule surrounding the end of each of the sections of the rod, a semicylindrical portion formed with and extending outward from one of the ferrules, and the other ferrule adapted to fit within the semicylindrical portion when the two sections of the rod are in alinement, the two ferrules being hinged together, means for holding the sections of the rod in alinement with one another, a staple extending outward from one of the ferrules, a chain secured to the staple, a snap-hook secured to the outer end of the chain, said chain adapted to be wrapped around the sections of the rod when the rod is folded and the hook snapped into one of the links of the chain, as and for the purpose specified.

In testimony whereof I have hereunto affixed my signature in the presence of two subscribing witnesses.

HIRAM M. McNAMEE.

Witnesses:
H. H. HANIN,
I. M. FOSTER.